US00RE44178E

(19) United States
(12) Reissued Patent
Trickett

(10) Patent Number: US RE44,178 E
(45) Date of Reissued Patent: Apr. 30, 2013

(54) DEVICE AND METHOD FOR TRANSPORTING MATERIALS

(76) Inventor: Howard J. Trickett, Hartville, OH (US)

(21) Appl. No.: 11/010,251

(22) Filed: Dec. 10, 2004

Related U.S. Patent Documents

Reissue of:
(64) Patent No.: 6,490,982
Issued: Dec. 10, 2002
Appl. No.: 09/526,021
Filed: Mar. 15, 2000

U.S. Applications:
(60) Provisional application No. 60/124,444, filed on Mar. 15, 1999.

(51) Int. Cl.
*B65D 19/00* (2006.01)

(52) U.S. Cl.
USPC ..... 108/51.11; 108/51.3; 248/346.02

(58) Field of Classification Search ..... 108/51.1, 108/56.1, 901, 51.3, 902; 248/346.02; 206/596, 206/598, 599, 386
See application file for complete search history.

(56) References Cited

U.S. PATENT DOCUMENTS

| | | | | |
|---|---|---|---|---|
| 2,913,206 | A | 11/1959 | Paris | |
| 2,918,242 | A | 12/1959 | Olivette et al. | |
| 3,776,145 | A * | 12/1973 | Anderson et al. | 108/57.16 |
| 3,788,462 | A * | 1/1974 | Meincer | 206/595 |
| 3,850,116 | A | 11/1974 | Mackes | |
| 4,042,127 | A | 8/1977 | Brossia | |
| 4,570,546 | A | 2/1986 | Batelka | |
| 4,649,007 | A | 3/1987 | Bonis et al. | |
| 5,062,370 | A | 11/1991 | Etlinger | |
| 5,226,372 | A | 7/1993 | Frenkel et al. | |
| 5,383,408 | A * | 1/1995 | Searcy | 108/57.16 |
| 5,441,154 | A * | 8/1995 | Youell, III | 108/51.3 |
| 5,535,668 | A * | 7/1996 | Besaw et al. | 108/51.3 |
| 5,570,643 | A | 11/1996 | Werner | |
| 5,601,035 | A * | 2/1997 | Herring et al. | 108/51.3 |
| 5,613,447 | A | 3/1997 | Trickett | |
| 5,613,477 | A | 3/1997 | Maeda | |
| 5,660,118 | A | 8/1997 | Adams, Jr. | |
| 5,794,542 | A * | 8/1998 | Besaw | 108/51.3 |
| 5,881,651 | A | 3/1999 | Trickett | |
| 5,934,474 | A * | 8/1999 | Renninger et al. | 108/51.3 |

(Continued)

FOREIGN PATENT DOCUMENTS

JP 54-149152 * 11/1979

OTHER PUBLICATIONS

Brudi Dedicated Push Pulls Brochure.

*Primary Examiner* — Jose V Chen
(74) *Attorney, Agent, or Firm* — Zollinger & Bucleson Ltd.

(57) ABSTRACT

Disclosed is a method and device for transporting materials from a shipping end to a receiving end. The device is a slip sheet formed from a flat sheet of material having a flat portion with four side edges. One of the side edges has a compressible tab portion that extends outwardly therefrom. The compressible tab portion has an elliptical lip and an upper lip that forms a convex air foil-type cross-sectional area. The compressible tab portion is canted upwardly from a plane defined by the flat portion of the slip sheet. The slip sheet can be used in combination with a captive pallet to transport materials. Further, a method of transporting materials is disclosed whereby the shipping and receiving ends house the captive pallet whereby only the slip sheet is transported by a push-pull or fork-lift type truck.

18 Claims, 7 Drawing Sheets

U.S. PATENT DOCUMENTS 6,041,718 A * 3/2000 Brandes et al. ..... 108/51.3
6,070,726 A * 6/2000 Graham ..... 108/51.3
6,186,078 B1 2/2001 Brown
6,490,982 B1 * 12/2002 Trickett ..... 248/346.02

* cited by examiner

DEVICE AND METHOD FOR TRANSPORTING MATERIALS

Matter enclosed in heavy brackets [ ] appears in the original patent but forms no part of this reissue specification; matter printed in italics indicates the additions made by reissue.

This application claims the benefit of U.S. provisional application, Ser. No. 60/124,444 filed on Mar. 15, 1999, in Express Mail Label No. EL287032906US by the same inventor, Howard J. Trickett, entitled DEVICE AND METHOD FOR TRANSPORTING MATERIALS.

BACKGROUND OF THE INVENTION

I. Field of the Invention

This invention pertains to the field of transporting materials and, more particularly, to transporting materials by a fork-lift and push-pull type truck. This invention eliminates the pallets commonly used in the transportation cycle and provides a better and more advantageous pallet.

II. Description of the Related Art

The present invention contemplates a new and improved method and device for transporting materials which is simple in design, effective in use, and overcomes the foregoing difficulties and others while providing better and more advantageous overall results.

The world population is increasing. In fact, the UN Food & Agriculture Organization projects an increase of 5 to 7 billion people over the next 30 years. This is like adding a new China or India every 10 years.

Population increase and economic expansion consumes land for housing and infrastructure. The earth's land and its resources are limited. Science and technology have provided us with the ability to do more while using less of the available land and resources. However, science and technology are limited as to what they can provide. Mother Earth will be stressed to keep up with world population expansion.

Quality of life is inextricably linked to the basics: reproduction, food, housing, packaging and transportation. Technology plays a major role by providing for a better standard of living for the worlds' people. However, responsible business managers must be at the forefront of developing, providing and using environmentally responsible products.

For over sixty years products have been placed on wood pallets and we have used forklifts to load these products into trailers, containers and railcars. In today's world of high technology this equates to farming with a pair of oxen and a shovel plow. Packaging on wooden pallets can no longer be rationalized nor can shipping the product to a customer who throws the wood pallet into a trash receptacle with the pallet ultimately ending up in a landfill. Landfills are being closed and the trees required to make a good quality wood pallet are becoming scarce thus making the wood more expensive. Today's U.S. wood pallet average cost is over eight dollars. Landfill expense pushes the total cost of using a wood pallet to about ten dollars. This cost adds to the packaging, logistics and ultimately to the consumer's cost of the products they purchase.

Data indicates the global market for wood pallets is in excess of one billion units annually. The data does not include remanufactured or reused pallets. This data also indicates that the U.S. uses over five hundred million wood pallets annually. About four hundred and fifteen million (83%) end up in landfills, about eighty million (16%) are recycled/reused and about five million (1%) disposed of as firewood.

One of the challenges being addressed is the depletion of the world forest to manufacture wood pallets which are then disposed into landfills. We will teach how to use commercially and economical feasible replacement products made from recycled material and/or commercially and economical feasible replacement products that can be recycled back into themselves. These products will be used as the material handling system for the 21st century.

The material handling industry is an industry seeking a change, but until now lacked an uncomplicated economical alternative to the wood pallet. The slip sheet disclosed and claimed within U.S. Pat. No. 5,613,447 and co-pending patent application, Ser. No. 08/823,698 (now U.S. Pat. No. 5,881,651) are those unpretentious economical alternatives. The use of such a slip sheet in conjunction with a captive pallet system leads the way to the future of material handling. These two items taken together, finally accomplish what so many have tried for so long to achieve.

A captive pallet system is one where the shipper and receiver use a good quality wood, plastic or metal pallet to handle the product in-house while the product is packaged on a slip sheet.

The unit of product has hereto been pulled by means of a forklift attachment called a push-pull, from the captive pallet at the point of shipment and the slip sheet becomes the article of conveyance to transfer the unit of product from the shipper to the receiver. Thus the captive pallet is kept or "captured" for reuse at the point of shipment.

At the receiving point, the product is pulled from the trailer using a push-pull attachment or a regular fork-lift truck and placed on the purchaser's captive pallet. From that point, it is handled as a normal palletized load using a regular forklift and normal warehouse storage techniques. The shipping/receiving cycle is described in greater detail later in this application.

Both the producer and his customer keep their good quality wood, metal or plastic pallet in-house. The issue of who destroyed or damaged a $50-$200 plastic pallet, who pays for a lost pallets, cost of returning empty pallets and all the associated problems of using inferior quality wood pallets and wood pallets in general are eliminated.

The slip sheet utilized by the present invention is a product which utilizes and creates a market for virgin and/or recycled and/or off- specification polymeric material. The design of the slip sheet corrects the inherent problems of current plastic and fiber slip sheets. To teach the scope of these problems, later herein is a short synopsis of the problems associated with prior known slip sheets.

The disclosed slip sheet allows the material handling industry to adopt it as a shipping medium, currently performed by pallets. The design this slip sheet eliminates the need for a forklift attachment called a push-pull at the shipping location for many products.

The purpose of this invention is to eliminate the need for a push-pull attachment at the receiving end after product has been shipped using the disclosed slip sheet.

There are two major obstacles associated with current slip sheets. One obstacle is the occurrence of inaccessibility of the lip/tab due to crumpling during transit or shifting of the load. The other obstacle is maintenance of the product on the slip sheet in transit.

Additionally, there are related issues with current slip sheets. Product damage and/or spillage caused by the push-pull gripper jaws colliding with the packaged unit in the operators attempt to grasp the deficient lip/tab. Product damage and/or spillage caused by the push-pull gripper jaws colliding with the packaged unit during the push-pull's jaw release and push cycle. Further, cost considerations need to be made because of the need to have a push-pull at both the shipping and receiving points to handle the current slip sheets. Also, the increasing cost of more sophisticated designed push-pull in an attempt to overcome the inadequacy of current slip sheets lip/tab and their resultant cost as a high maintenance item must be considered.

Field interviews verify that slip sheet and push-pulls in general, do not work well and exhibit these shortcomings, preventing slip sheets from enjoying a greater share of the material handling market.

One material handling area that slip sheets have made an impact is in the grocery industry. However it is one thing to shift a few hundred pound palletized unit of potatoes chips or corn flakes back unto the slip sheet and another thing to restack 2500 pounds of 40 or 80 pounds bags of salt that has shifted in transit. It should be noted that with present slip sheet design, it is only necessary that the product shift as little as ⅛ inch and the lip/tab crease will be covered pushing the lip/tab tightly against the floor of the trailer/container/railcar. With certain bagged products, simply settling during transit will cause the footprint of the product to expand covering the creased area, causing it to be pushed tightly against the floor. Obviously, this creates a problem at the receiving end as it is impossible to grasp the tab/lip and the jaws and platens of the push-pull slide over the top of the product, resulting in product damage. It then become incumbent upon the receiver to unload the unit by hand with manual labor called "humping".

The technique to make the slanted lip disclosed within U.S. Pat. No. 5,881,651, was added to further enhance and ensure the ability of the lip/tab to fold-up and not crumple when units are added in-line. It was this concept that assured good presentation of the lip/tab for the push-pull's jaws to clamp and/or make an accentuated angle so an operator could simply drop the lift trucks push-pull's platens and/or forks and slip under the slip sheet.

By having a compressible convex airfoil-type cross-sectional area to facilitate the grasping of this type lip/tab in conjunction with the front sidewall, several of the needs of a slip sheet were met. Obviously, it was discovered this design also allowed us to employ a conventional lift truck with tapered forks, meeting several of the additional needs of the material handling industry.

SUMMARY OF THE INVENTION

In accordance with the present invention, there is disclosed a new and improved captive pallet and slip sheet combination which overcomes the problems associated with both a wood pallets transport system and a captive pallet transport system.

Further in accordance with the invention, the slip sheet of the present invention is formed from a flat sheet of material having a flat load receiving portion and four side edges. It is within the scope of the present invention to provide a slip sheet of the type disclosed in U.S. Pat. No. 5,881,651. However, it is further within the scope of the present invention to provide a slip sheet having conventional tabs, or having no tabs. Slip sheets having other designs may require the receiver to use push/pull attachments on forklifts.

Further in accordance with the invention, the captive pallet of the present invention comprises a first fork receiving area for reception of the forks of a conventional forklift for use when the captive pallet is moved, whether in a loaded or unloaded state. The captive pallet also provides a second fork receiving area for reception of the forks of a conventional forklift when it is desired to move only the load, either to load onto the captive pallet or remove from the captive pallet. Various embodiments of captive pallets are provided in the present invention, all having the common feature of providing first and second fork receiving areas. When the captive pallet is engaged on a ground surface in position for normal usage, the second fork receiving area is located higher from the ground surface than the first fork receiving area. The first fork receiving area is characterized by the presence of at least one upper barrier member against which the forks abut when the captive pallet is raised off the ground by the action of the associated forklift. The second fork receiving area is characterized by the absence of any upper barrier. The captive pallet further includes a plurality of planar load supporting surfaces adjacent the second fork receiving areas.

Further in accordance with the invention, there is provided a method of transporting materials. The method includes utilization of a captive pallet and slip sheet combination. A captive pallet having a first fork reception area adapted for use with the forks of an associated forklift. The captive pallet further includes a second fork reception area adapted for use with the forks of an associated forklift. An unloaded captive pallet may be properly positioned for reception of a load by placing the forks of an associated forklift into the first fork receiving area, raising the captive pallet from its resting position, transporting the captive pallet to a load receiving area, and lowering the captive pallet to the ground (or loading platform, etc). A slip sheet may then be positioned onto the load supporting surfaces. A load of material may be placed onto the load receiving portion of the slip sheet. The material may be secured to the slip sheet by any means known in the art such as binding, shrink wrapping and the like. The combination of loaded slip sheet and the captive pallet may be transported to another area by utilizing the associated forklift and the first fork receiving areas as discussed above. In order to move only the loaded slip sheet, the forks of the associated forklift are inserted into the second fork receiving areas. Upward movement of the forks cause the forks to abut the underside of the slip sheet and lift it off the captive pallet.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein.

DESCRIPTION OF THE PREFERRED EMBODIMENT

Push-pulls were originally designed over forty years ago to be used with cardboard and fiberboard slip sheets. The ambition for the slip sheet was to replace a wood pallet and/or pallets in general as the instrument which move products from a shipping location to a receiving location.

Figure 1:
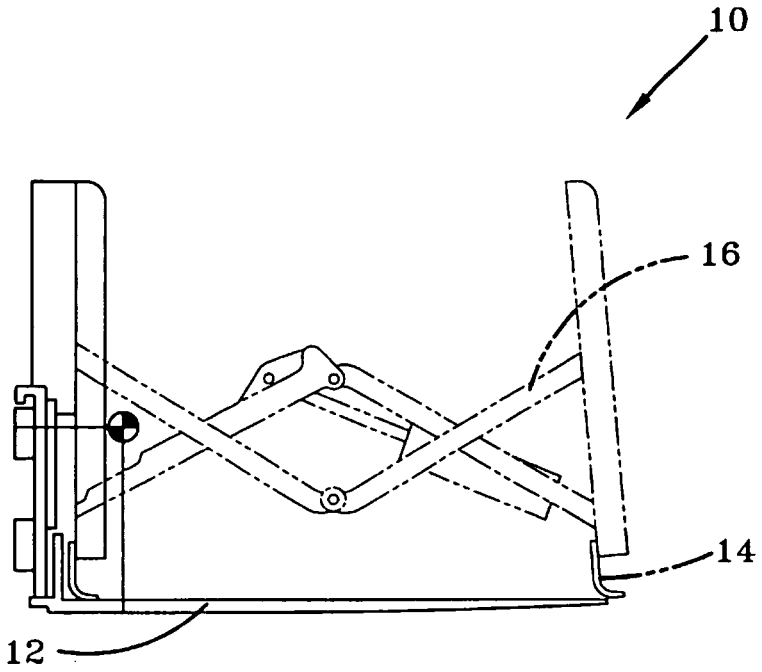
FIG. 1 is a side view of a push-pull type truck's forks and push-pull apparatus.
Figure 2:
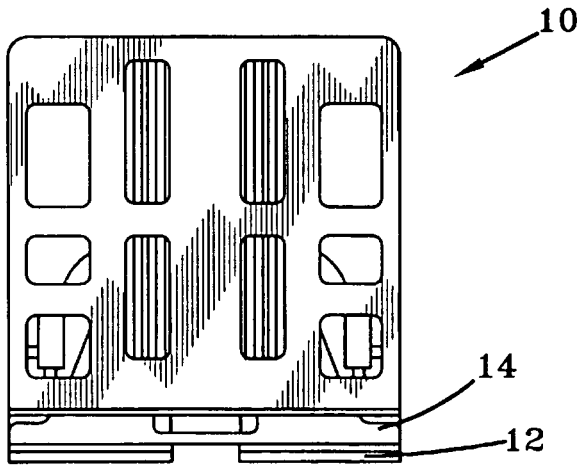
FIG. 2 is a front view of a push-pull type truck's forks and push-pull apparatus.

Referring now to the drawings, which are for purposes of illustrating a preferred embodiment of the invention only, and not for purposes of limiting the invention, FIGS. 1 and 2 show a push-pull 10 having two forks 12 which have an extreme taper at the end. These forks are also known within the industry as platens. The platens 12 support the weight of the material as it is pulled from the captive pallet.

Figure 8:
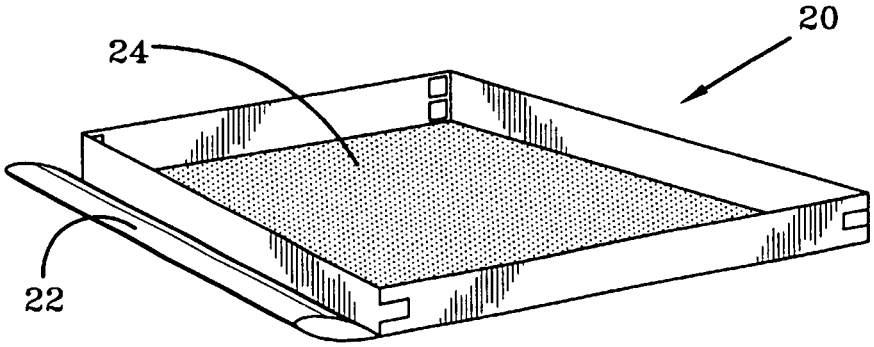
FIG. 8 is a perspective view of a slip sheet.
Figure 9:
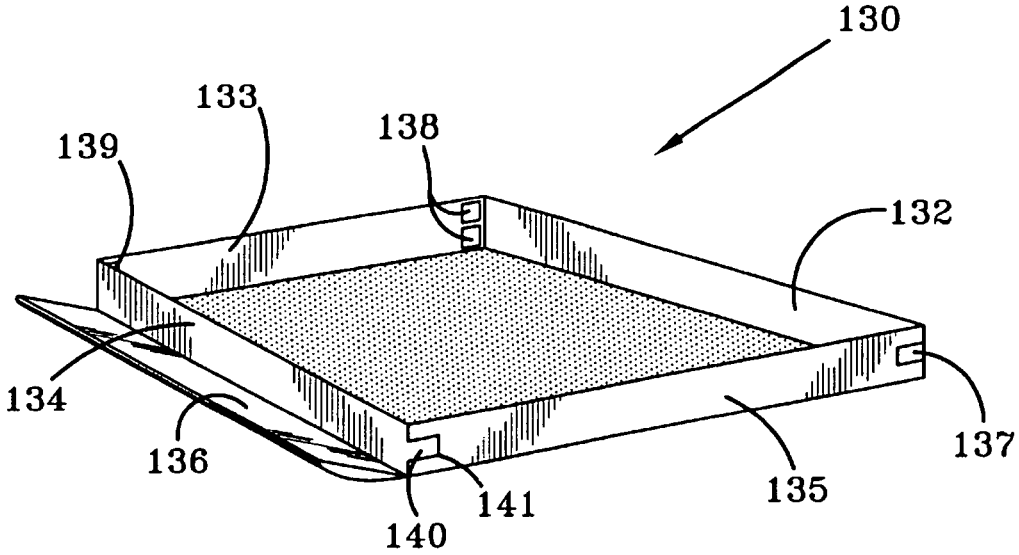
FIG. 9 is a perspective view of a slip sheet of the invention described herein.
Figure 10:
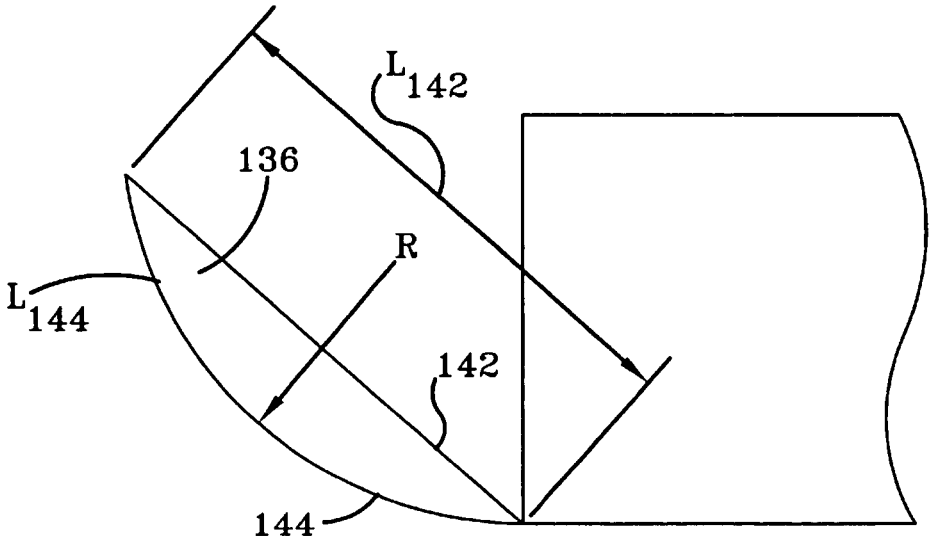
FIG. 10 is an enlarged side view showing the compressible tab of the slip tray of FIG. 9.

The push-pull hydraulics extend the attachment jaw 14 to grip a lip/tab 22 (best shown in FIG. 8) which extends beyond the footprint or surface loading area 24 of the slip sheet 20. As the push-pull gripper jaws 14 close, the hydraulic extension 16 retracts and pulls the load that is packaged on the slip sheet 20 from the captive pallet onto the platens 12. The load is taken to the loading dock and the push-pull hydraulic extension 16 pushes the load into the conveyance vehicle. Next, the hydraulic extension 16 opens the gripper jaws 14 and hydraulically pushes the load from the platens 12 simultaneously as the lift truck backs away from under the load. Thus, the load is deposited on the floor of the trailer or double-stacked onto a similar load.

At the receiving end, the purchaser/receiver, using a push-pull 10 grips the edge of the slip sheet 20, pulling it onto the platens 12, carries it to a captive pallet and pushes the load onto a waiting captive pallet. From that point, the material is handled in-house in the same manner as if it had been originally shipped on a conventional wood, plastic, or metal pallet.

In another embodiment, a captive pallet may not be used, and the slip sheet 20 will serve as the support base while the material is stored in-house.

Figure 3:
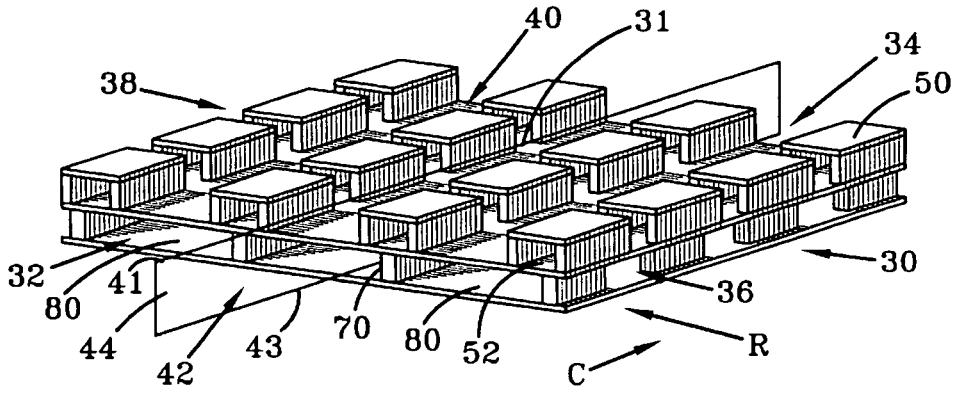
FIG. 3 is a perspective view of a captive pallet disclosed herein.
Figure 4:
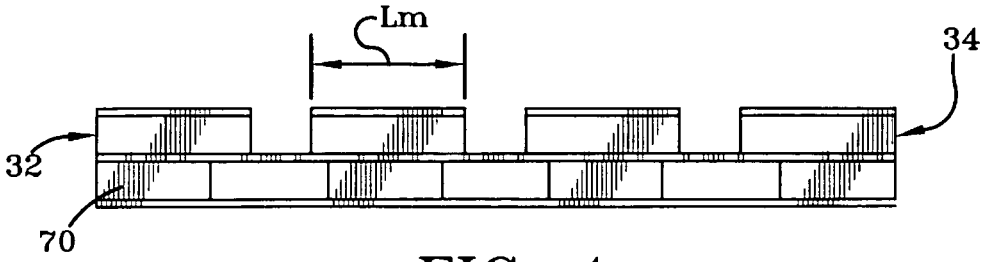
FIG. 4 is a side view of the captive pallet of FIG. 3.
Figure 5:
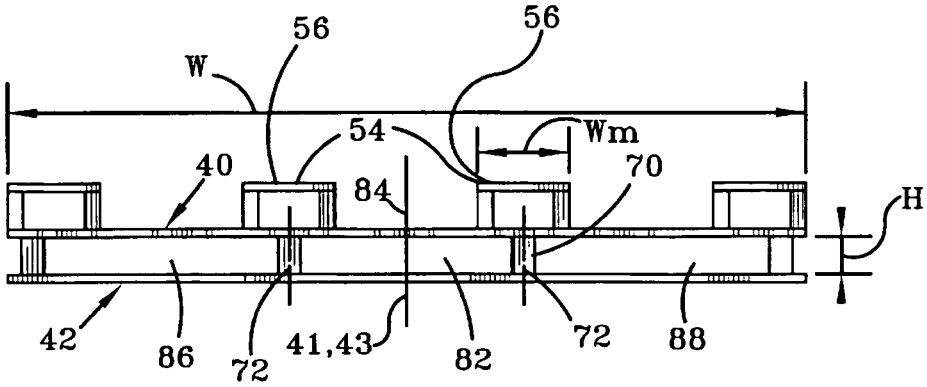
FIG. 5 is a front view of the captive pallet of FIG. 3.

FIGS. 3-5 depict a preferred embodiment of the invention herein. A captive pallet 30 is shown having a front 32, a rear 34 and sides 36, 38. The front 32 and rear 34 of the captive pallet 30 are both able to receive the forks 12 of a fork-lift type truck. The captive pallet 30 shown is preferably rectangular in configuration but also could be square or other shapes and still be within the scope of this invention.

The captive pallet 30 comprises a top 40 and bottom 42 both of which have a centerline 41, 43. The centerlines 41, 43 are taken from the width W of the captive pallet 30. In its preferred embodiment, the center line 41 of the top 40 and the centerline 43 of the bottom 42 lie along the same vertical plane and in-line with one another. This creates vertical plane 44 formed by centerline 41 of the top 40 and centerline 43 of the bottom 42.

The top 40 comprises a plurality of members 50 that preferably have an inverted u-shape. The inverted u-shaped members 50 are preferably spaced apart according to the width W of the captive pallet 30 and preferably comprise four (4) rows and four (4) columns. The columns C extend from the front 32 to the rear 34 of the captive pallet 30. The rows R extend from the side 36 to the other side 38 of the captive pallet 30. Therefore, in its most preferred embodiment, the captive pallet 30 comprises sixteen (16) inverted u-shaped members 50. However, alternative arrangements and either eliminating the rows R or columns C are within the scope of this invention.

The inverted unshaped members 50 each have a length $L_M$ and a width $W_M$. Preferably, the overall width W is 45 inches (114.3 cm) and the column $W_C$ is preferably 6.5 inches (16.51 cm). Therefore, the width of the members $W_M$ is 6.25 inches (15.875 cm) and 6.5 inches. The members 50 nearest the sides 36, 38 are typically 6.25 inches in width, while the two center members are typically 6.5 inches. However, the width W of the captive pallet 30 can vary as well as the width $W_M$ of the members, as well as the column width $W_C$.

The preferred embodiment of the inverted u-shaped members 50 are disclosed as having a hollow portion 52 thus creating the u-shape. However, the hollow portion 52 can be eliminated thus leaving the member 50 as solid. Again, in its most preferred embodiment, the center columns 54 of the members 50 have a centerline 56 such that they lie along the same line and in the same plane of their respective later-described dividers 70. The overall preferred embodiment is such that there is equal distribution of weight over the center 31 of the captive pallet 30. This is accomplished by having the center columns 54 in their most preferred embodiment, as described above.

Dividers 70 are mounted between the top 40 and bottom 42 of the captive pallet 30. The dividers 70 join the top 40 and bottom 42 of the captive pallet 30. The dividers 70 extend from the pallet front 32 and terminate at the pallet rear 34. The dividers 70 aid in support of the material the captive pallet 30 is supporting. Further, the dividers 70 create the later-described slots 80. The dividers 70 are preferably rectangular in shape. The dividers 70 are located such that their centerline 72, which runs from the pallet front 32 to the pallet rear 34, is parallel with the sides 36, 38 of the captive pallet 30. However, having the centerline 72 of the dividers 70 can also be situated such that their centerline is not parallel to the sides 36, 38. However, having the centerlines 56 situated such that they are parallel with the sides 36, 38 allows for the forks 12 to enter within the later-described slots 80 and not be interfered by, or with the dividers 70. The dividers 70 must have a height H great enough to allow the forks to enter between the top 40 and bottom 42 of the captive pallet 30. Additionally, the height H must be such that it allows the forks 12 to enter the captive pallet 30 easily and without having to be extremely precise. Preferably, the dividers 70 comprise sixteen (16) equally spaced in rows and columns.

Slots 80 are formed by the top 40, bottom 42 and the dividers 70. The slots 80 are located along the front 32 and rear 34 of the captive pallet 30. In its preferred embodiment, one of the slots 80 is located within the center of the captive pallet 30 such that it shares the same vertical centerline as that of the top 40 and bottom 42 of the captive pallet 30. Or put another way, the centerline 84 of the center slot 82 is in-line with the centerlines 41, 43. Preferably, the captive pallet 30 comprises three (3) slots thereby equalizing the captive pallet 30.

Figure 6:
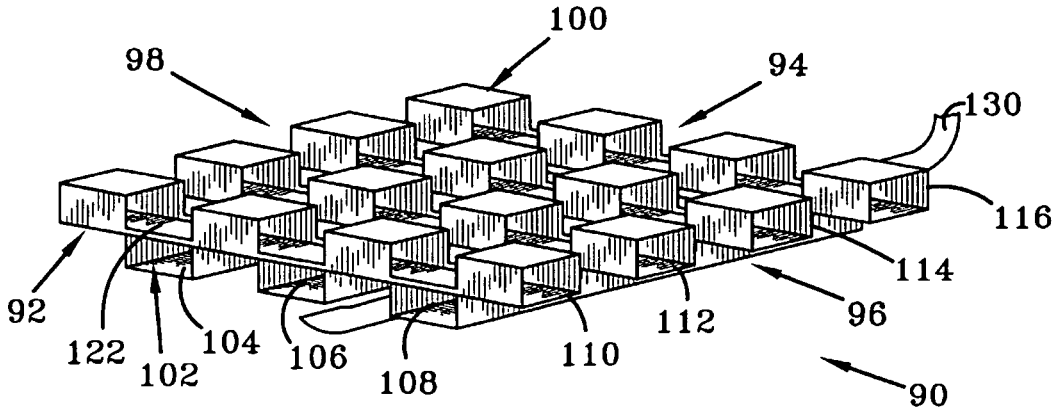
FIG. 6 is a perspective view of an inverted captive pallet.
Figure 7:
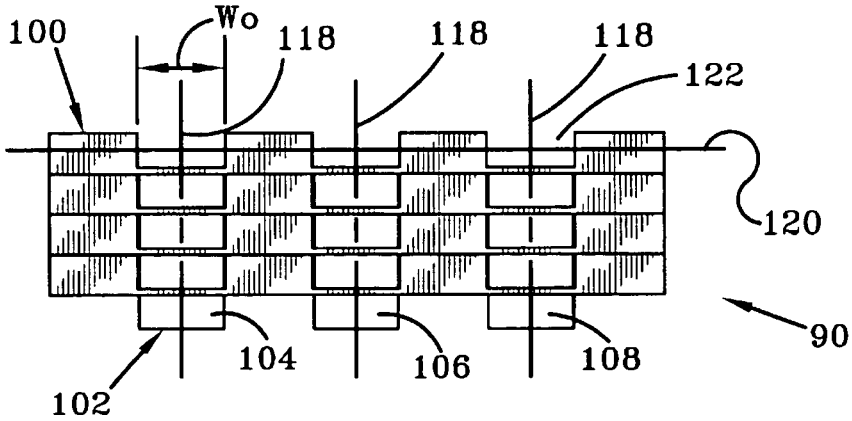
FIG. 7 shows the nesting of the inverted captive pallets.

With reference to FIGS. 6 and 7, an alternative embodiment of the present invention is disclosed. An inverted captive pallet 90 is shown having a front 92, rear 94, sides 96, 98, top 100 and base 102. A plurality of first channels 104, 106, 108, form the base 102. A plurality of second channels 110, 112, 114, 116 form the top 100. The first channels 104, 106, 108 have a width, centerline and extend from the pallet front 92 to the pallet rear 94. The first channels 104, 106, 108 accept the forks 12 of the truck. Preferably, the first and second channels are rectangular.

The second channels 110, 116 have a length, width and centerline and are mounted to the first channels 104, 108. The centerline 118 of the first channels are perpendicular to the centerlines 120 of the second channels. The second channels 110 can also form, by themselves, the sides 96, 98 of the inverted captive pallet 90. The second channels preferably have a plurality of u-shaped openings 122. The u-shaped openings 122 allow for the insertion of a securing means 130 to underlie a load placed upon the inverted captive pallet 90. The securing means 130 is typically some sort of a strap, belt or other means to secure the load placed upon the inverted captive pallet 90.

In its preferred embodiment, the inverted captive pallet 90 comprises three (3) first channels 104, 106, 108 and the second channels 110, 112, 114, 116 comprise four (4) each having three (3) u-shaped openings 122. Each u-shaped opening 122 has a centerline that corresponds with the centerline 120 of the 118 first channels 104 106, 108. Put another way, each u-shaped opening 122 is located directly above the first channels 104 106, 108 such that the centerline of the u-shaped opening and the centerline of the first channel lie along the same vertical plane. Preferably, the ushaped openings each have a width Wo 3.5-8.0 inches, inclusive. Again, in the preferred embodiment, the width Wo of the openings 122 are greater than the width of the first channels 104, 106, 108. As shown within FIG. 7, this allows for proper stacking of the captive pallets 90 upon themselves. The first channels 104, 106, 108 fit within each of the openings 122, which also allow for proper removal by a fork-lift type truck.

The slip sheet 130 of the present invention has upstanding walls 132, 133, 134, 135, as well as grasping tab 136. Folded portions 137, 138, 139 and 140 are registered and affixed to the walls within slotted portions 141 as shown. The advantage of the grasping tab 136 from those known in the prior art is the cross-section which has one offset crease to allow for a "spring" action of an elliptical lip 144. This serves to keep an elliptical lip 144 off of the supporting surface. Additionally, this keeps the elliptical lip 144 from being compressed and/or crushed from material set on top and/or pushed up against its opposite lip 144. This is accomplished by the off-set crease wherein the length $L_{144}$ of the elliptical lip 144 exceeds the length $L_{142}$ of the lip 142. The length $L_{144}$ is measured as its perimeter, thus yielding the length $L_{144}$. Thus, the tab 136 has two (2) lips, an elliptical lip 144 having a radius of curvature R, and lip 142 being relatively flat, or having multiple creases to allow for ridged off-set lips, i.e., fiber board. This elliptical lip 144 permits the grasping fingers on a push-pull type lift truck to obtain a better grip.

A method of transporting materials utilizes a slip sheet and captive pallet combination. The slip sheet is typically upon the captive pallet whereby the material to be transported is within the slip sheet. The method comprises placing the material to be transported within the slip sheet from a shipping location. The material within the slip sheet is preferably secured by the above-mentioned securing means. The slip sheet and its material are then removed from the captive pallet by a push-pull or fork-lift type truck. The push-pull type truck typically utilizes its features to grasp the tab portion 136 of the slip sheet 130 to pull the slip sheet from the captive pallet. The captive pallet does not leave the shipping location and it used for incoming slip sheets.

The slip sheet, along with the material contained therein, is placed within a movable carrier such as a tractor-trailer type truck, or other means, and shipped to its receiving location. At the receiving location, the slip sheet is removed from the movable carrier by use of a push-pull or fork-lift type truck similar to the manner described above. The slip sheet is then placed upon a pallet, or captive pallet.

Figure 11:
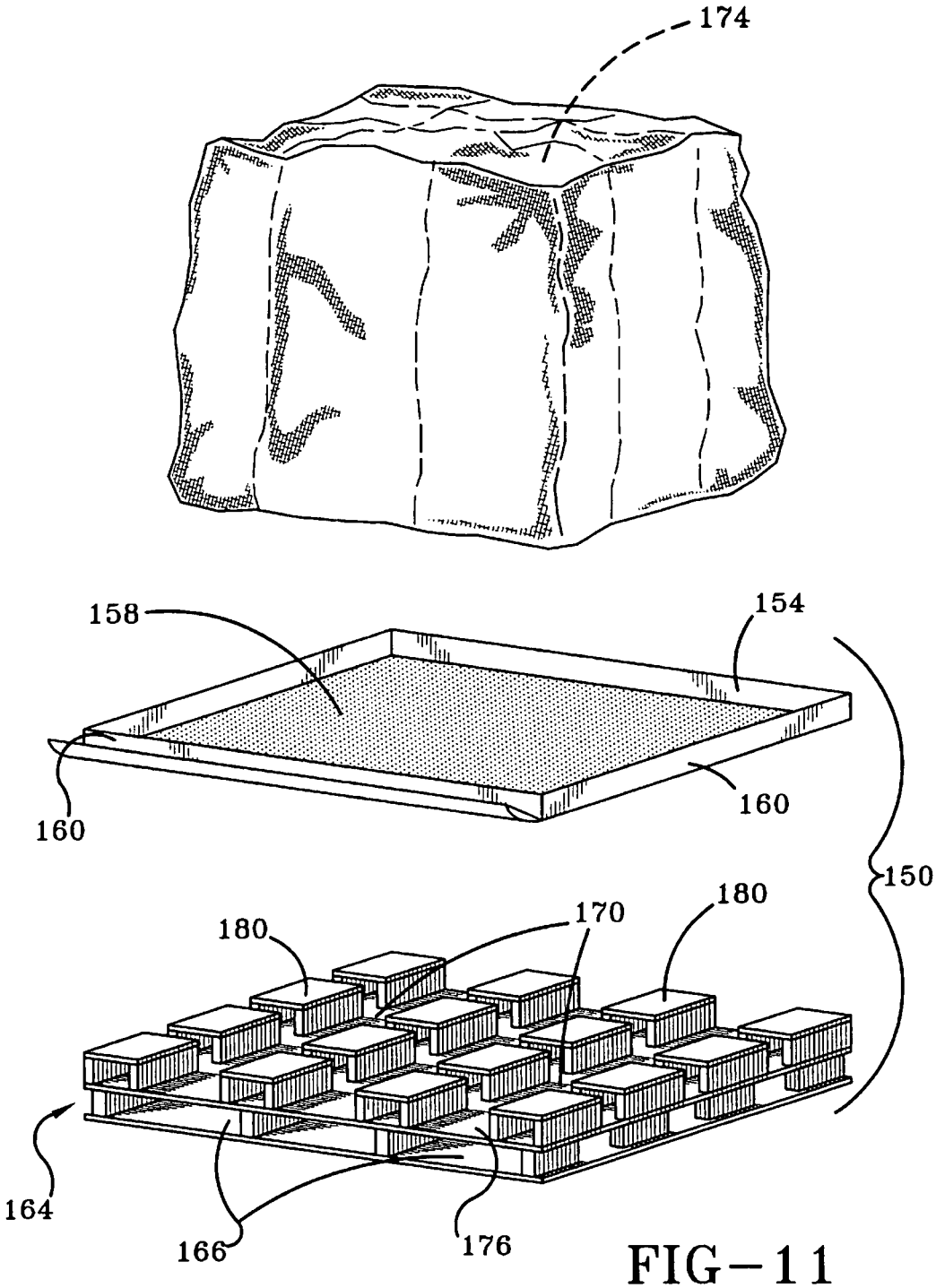
FIG. 11 is an exploded view of a captive pallet/slip sheet combination of the present invention.

The present invention, is further directed to a new and improved captive pallet and slip sheet combination 150 as shown in FIG. 11. The slip sheet 154 is formed from a flat sheet of material having a flat load receiving portion 158 and four side edges 160. It is within the scope of the present invention to provide a slip sheet of the type disclosed in U.S. Pat. No. 5,881,651. However, it is further within the scope of the present invention to provide a slip sheet having conventional tabs, or having no tabs. Slip sheets having these other designs may require the receiver to use push/pull attachments on forklifts.

Figure 12:
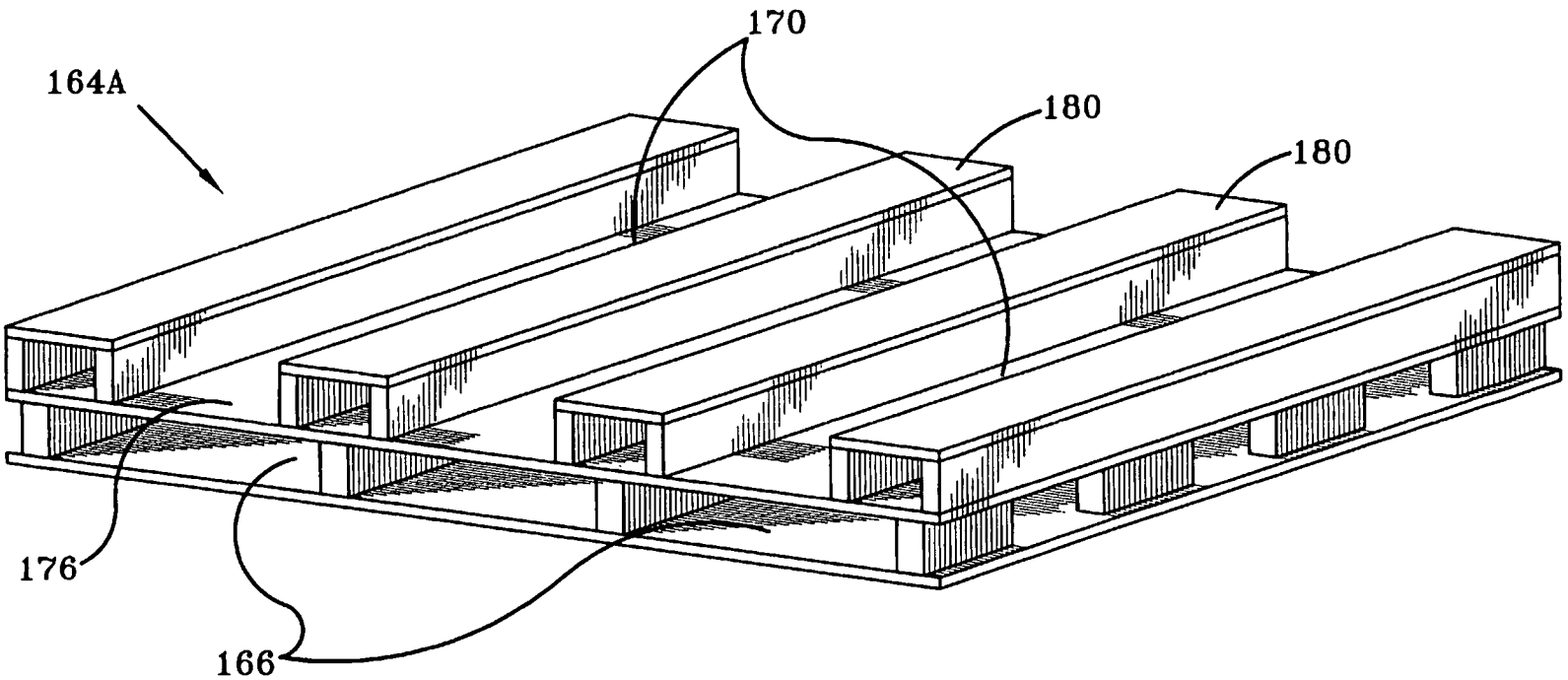
FIG. 12 is a perspective view of a further embodiment of a captive pallet.
Figure 13:
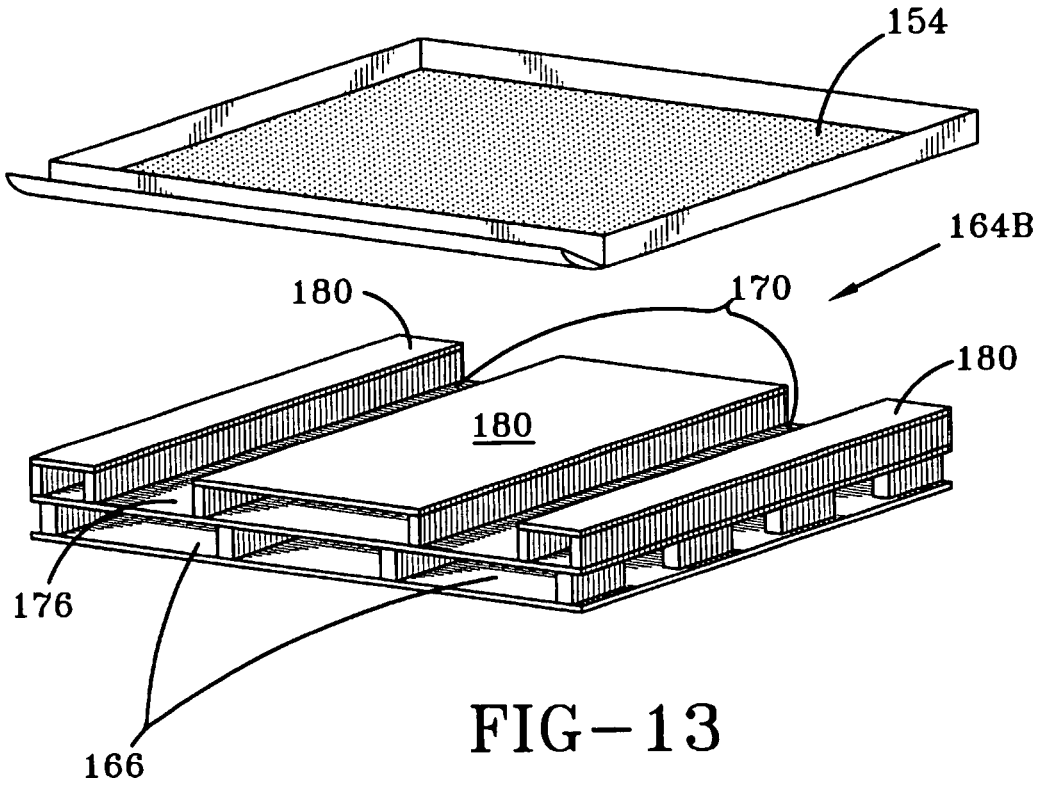
FIG. 13 is an exploded view of another embodiment of a captive pallet/slip sheet combination according to the invention; and, FIG. 14 is a perspective view of yet another embodiment of a captive pallet.
Figure 14:
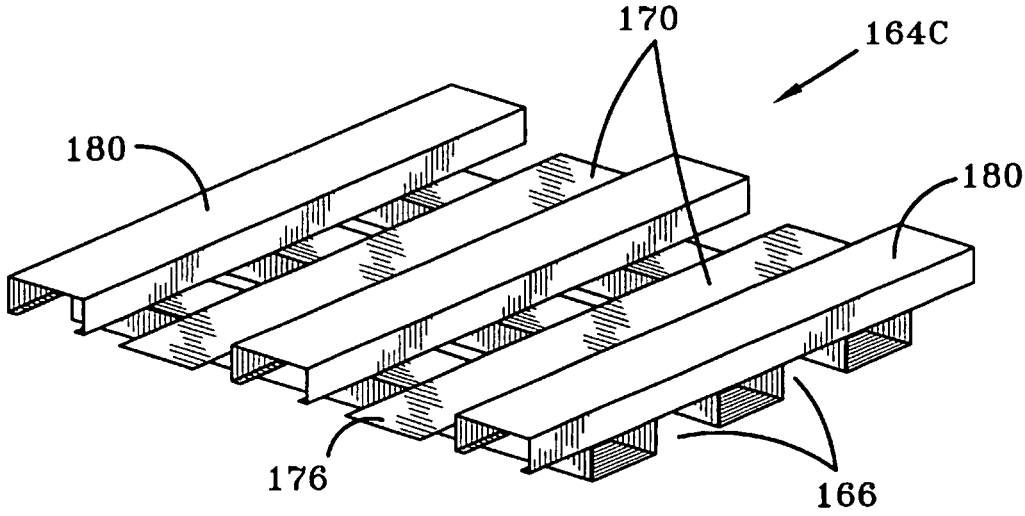

The captive pallet 164 comprises a first fork receiving area 166 for reception of the forks of a conventional forklift (not shown) for use when the captive pallet 166 is moved, whether in a loaded or unloaded state. The captive pallet 164 also provides a second fork receiving area 170 for reception of the forks of a conventional forklift when it is desired to move the slip sheet 154 with or without a load 174 (shown in phantom lines), either to place it upon the captive pallet 164 or remove it from the captive pallet 164. Various embodiments of captive pallets 164A-164C are shown in FIGS. 12-14, all having the common feature of providing first and second fork receiving areas 166, 170. When the captive pallet 164 is engaged on a ground surface in position for normal usage, the second fork receiving area 170 is located higher from the ground surface than the first fork receiving area 164. The first fork receiving area 164 is characterized by the presence of at least one upper barrier member 176 against which the forks abut when the captive pallet 164 is raised off the ground by the action of the associated forklift. The second fork receiving area 170 is characterized by the absence of any upper barrier. The captive pallet 164 further includes a plurality of planar load supporting surfaces 180 adjacent the second fork receiving areas 170.

With reference to FIG. 11, a method of transporting materials includes utilization of a captive pallet 164 and slip sheet 154 combination. A captive pallet 164 having a first fork reception area 166 adapted for use with the forks of an associated forklift (not shown). The captive pallet 164 further includes a second fork reception area 170 adapted for use with the forks of an associated forklift. An unloaded captive pallet 164 may be properly positioned for reception of a load by placing the forks of an associated forklift into the first fork receiving area 166, raising the captive pallet 164 from its resting position, transporting the captive pallet 164 to a load receiving area, and lowering the captive pallet 164 to the ground (or loading platform, etc). A slip sheet 150 may then be positioned onto the load supporting surfaces 180. A load 174 of material may be placed onto the load receiving portion 158 of the slip sheet 154. The load 174 may be secured to the slip sheet by any means known in the art such as binding, shrink wrapping and the like. The combination of loaded slip sheet 154 and the captive pallet 164 may be transported to another area by utilizing the associated forklift and the first fork receiving areas 166 as discussed above. In order to move only the loaded slip sheet 154, the forks of the associated forklift are inserted into the second fork receiving areas 170. Upward movement of the forks cause the forks to abut the underside of the slip sheet 154 and lift it off the captive pallet 164.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:

1. A slip sheet in combination with a captive pallet for use with a fork-lift and/or push-pull type truck formed from a flat sheet of material comprising:

a flat portion for receiving goods, said flat portion having four side edges, at least one said side edge having a compressible tab portion extending outwardly therefrom, said compressible tab portion having an elliptical lip and an upper lip forming a convex airfoil-type cross-sectional area, wherein said compressible tab portion is canted upwardly from a plane defined by said flat portion of said slip sheet;

said captive pallet further comprises a front, rear, and a side, said captive pallet front and rear able to accept forks from a fork-lift type truck, a top section having a centerline, a bottom section having a centerline, a plurality of members mounted to said top section extending from said captive pallet front and extending to said captive pallet rear and being parallel to said captive pallet sides, a plurality of dividers mounted between said top and bottom sections, said dividers joining said top and said bottom sections, said dividers having a centerline extending parallel to said captive pallet sides, said dividers extending from said captive pallet front and terminating at said captive pallet rear, a plurality of slots, said slots being formed by said top section, bottom section and said dividers, said slots located along said front and said rear of said captive pallet, one of said slots being a center slot having a centerline located in-line with said centerline of said top and bottom sections, said slots able to accept said forks of the fork-lift type truck.

2. The slip sheet as recited within claim 1 wherein said plurality of members are inverted u-shaped members.

3. The slip sheet and captive pallet combination as recited within claim 2 wherein said plurality of inverted unshaped members have centerlines, wherein two of said inverted unshaped centerlines lie along the same vertical plane as at least two of said centerlines of said dividers.

4. The slip sheet and captive pallet combination as recited within claim 2 wherein said plurality of inverted unshaped members comprises four.

5. The slip sheet and captive pallet combination as recited within claim 2 wherein said plurality of inverted unshaped members comprise sixteen forming four rows and four columns.

6. The slip sheet and captive pallet combination as recited within claim 1 wherein said plurality of dividers comprises between four and sixteen.

7. The slip sheet and captive pallet combination as recited within claim 1 wherein said plurality of slots comprises three.

8. The slip sheet and captive pallet combination as recited within claim 1 wherein said plurality of members comprises sixteen forming four rows and four columns.

9. The slip sheet and captive pallet combination as recited within claim 1 further comprising a securing means extending within said rows.

10. The slip sheet and captive pallet combination as recited within claim 1 further comprising a securing means, said securing means to secure a product seated upon said slip sheet, said securing means extending within said rows.

*11. A slip sheet in combination with a captive pallet for use with a fork-lift and/or push-pull type truck; the slip sheet being formed from a flat sheet of material; the combination comprising:*

*said slip sheet having flat portion for receiving goods, said flat portion having four side edges,*

*said captive pallet further comprising a front, rear, and a side, said captive pallet front and rear able to accept forks from a fork-lift type truck, a top section having a centerline, a bottom section having a centerline, a plurality of members mounted to said top section extending from said captive pallet front and extending to said captive pallet rear and being parallel to said captive pallet sides, a plurality of dividers mounted between said top and bottom sections, said dividers joining said top and said bottom sections, said dividers having a centerline extending parallel to said captive pallet sides, said dividers extending from said captive pallet front and terminating at said captive pallet rear, a plurality of slots, said slots being formed by said top section, bottom section and said dividers, said slots located along said front and said rear of said captive pallet, one of said slots being a center slot having a centerline located in-line with said centerline of said top and bottom sections, said slots able to accept said forks of the fork-lift type truck.*

*12. The slip sheet and captive pallet combination of claim 11 wherein said plurality of members are inverted u-shaped members.*

*13. The slip sheet and captive pallet combination as recited within claim 12 wherein said plurality of inverted unshaped members have centerlines, wherein two of said inverted unshaped centerlines lie along the same vertical plane as at least two of said centerlines of said dividers.*

*14. The slip sheet and captive pallet combination as recited within claim 12 wherein said plurality of inverted unshaped members comprises four.*

*15. The slip sheet and captive pallet combination as recited within claim 12 wherein said plurality of inverted unshaped members comprise sixteen forming four rows and four columns.*

*16. The slip sheet and captive pallet combination as recited within claim 11 wherein said plurality of dividers comprises between four and sixteen.*

*17. The slip sheet and captive pallet combination as recited within claim 11 wherein said plurality of slots comprises three.*

*18. The slip sheet and captive pallet combination as recited within claim 11 wherein said plurality of members comprises sixteen forming four rows and four columns.*

* * * * *